(12) United States Patent
Rising

(10) Patent No.: US 8,511,094 B2
(45) Date of Patent: Aug. 20, 2013

(54) COMBUSTION APPARATUS USING PILOT FUEL SELECTED FOR REDUCED EMISSIONS

(75) Inventor: Bruce W. Rising, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 2288 days.

(21) Appl. No.: 11/454,698

(22) Filed: Jun. 16, 2006

(65) Prior Publication Data

US 2007/0289311 A1 Dec. 20, 2007

(51) Int. Cl.
*F02C 7/22* (2006.01)
*F02C 7/26* (2006.01)

(52) U.S. Cl.
USPC ............................................. 60/776; 60/746

(58) Field of Classification Search
USPC ................... 60/772, 776, 734, 746, 747, 780
See application file for complete search history.

(56) References Cited

U.S. PATENT DOCUMENTS

| | | | |
|---|---|---|---|
| 3,973,390 A * | 8/1976 | Jeroszko | 60/776 |
| 4,341,069 A | 7/1982 | Bell et al. | |
| 5,177,114 A | 1/1993 | Van Dijk et al. | |
| 5,404,711 A * | 4/1995 | Rajput | 60/39.463 |
| 5,740,667 A | 4/1998 | Bhattacharayya et al. | |
| 5,752,489 A * | 5/1998 | Henderson et al. | 123/494 |
| 5,946,917 A * | 9/1999 | Hums et al. | 60/723 |
| 6,324,827 B1 | 12/2001 | Basu et al. | |
| 6,422,858 B1 * | 7/2002 | Chung et al. | 431/8 |
| 6,865,889 B2 | 3/2005 | Mancini et al. | |
| 7,041,154 B2 * | 5/2006 | Staroselsky et al. | 95/30 |
| 7,168,488 B2 * | 1/2007 | Olsvik et al. | 166/266 |

FOREIGN PATENT DOCUMENTS

| | | |
|---|---|---|
| JP | 9-046817 | 2/1997 |
| JP | 2002-285175 | 10/2002 |
| JP | 2004-225546 | 8/2004 |
| JP | 2005-147136 | 6/2005 |

OTHER PUBLICATIONS

L.B. Davis and S.H. Black, "Dry Low NOx Combustion Systems for GE Heavy-Duty Gas Turbines", [Found on Web], Oct. 2000, pp. 1-22, GER-3568G, GE Power Systems, Schenectady, NY.
David Littlejohn, Waseem Nazeer, Ken O. Smith and Robert K. Cheng, "Low-Swirl DLN Injector for < 5 ppm NOx Gas Turbines", [Found on Web], Date not known, but prior to Dec. 2004, Environmental Energy Technologies Division Lawrence Berkeley National Laboratory, Berkeley, CA and Advanced Combustion Engineering Solar Turbines, San Diego, CA.

* cited by examiner

*Primary Examiner* — Andrew Nguyen

(57) ABSTRACT

A combustion apparatus (10) incorporating a dry low NOx (DLN) combustor (20) that uses two different fuels (30, 40) simultaneously. One fuel (30) is premixed with air (22) for a primary combustion zone (25), and a second fuel (40) supplies a diffusion pilot flame (29). Each fuel may be selected for its specialized role, maximizing overall combustion efficiency while lowering emissions. A primary fuel (30) such as natural gas (NG) may be chosen for its economy and combustion characteristics in a lean premix. A pilot fuel (40) may be chosen for having a low diffusion flame temperature and a clean burn. An oxygenated pilot fuel such as dimethyl ether (DME) has a lower flame temperature than natural gas, thereby reducing NOx from the pilot flame. The pilot fuel (40) may be produced from the primary fuel (30) by a reformer (50) associated with the combustion apparatus.

20 Claims, 1 Drawing Sheet

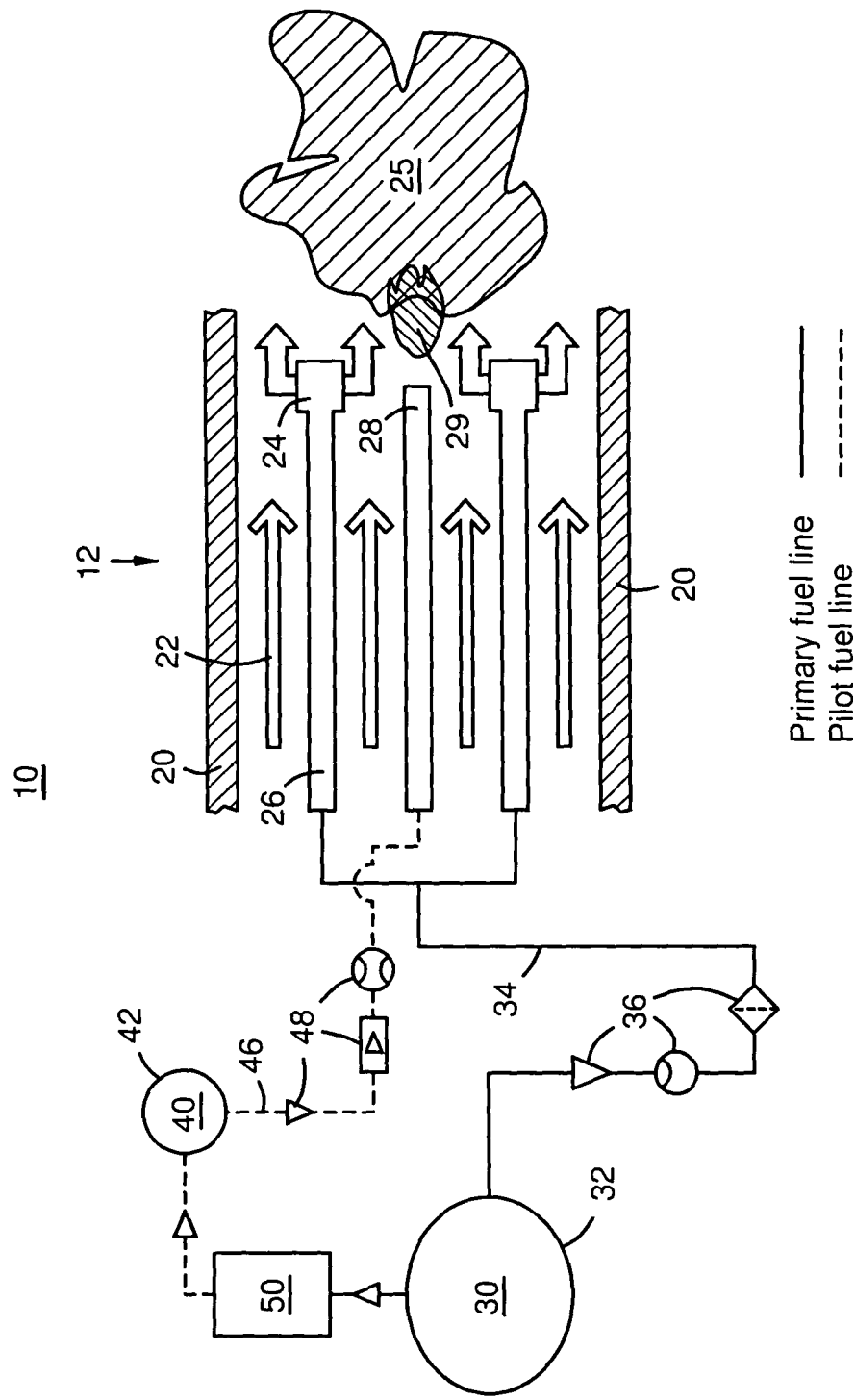

COMBUSTION APPARATUS USING PILOT FUEL SELECTED FOR REDUCED EMISSIONS

FIELD OF THE INVENTION

This invention relates generally to the field of gas turbine engines, and more particularly to dry low NOx combustor designs with an air/fuel premixing stage upstream of a primary combustion zone, and with a diffusion pilot flame to stabilize the lean primary combustion.

BACKGROUND OF THE INVENTION

Reduction of nitrogen oxides (NOx) in gas turbines has been achieved by controlling combustion zone temperature and residence time, or the time a burning fuel spends in a temperature range at which NOx is efficiently produced. Premixing fuel with air to a mixture leaner than stoichiometric equivalence can reduce the peak combustion temperature. This strategy is called Dry Low NOx combustion (DLN), or sometimes Dry Low Emissions combustion (DLE), because it does not depend on water injection to reduce the combustion temperature. However, a lean burn that is optimum for energy efficiency and low emissions can be unstable in some conditions. To minimize the risk of flameout or incomplete combustion, many combustor designs use a non-premixed pilot flame to stabilize a primary premixed flame, thereby reducing combustion dynamics.

A pilot flame is normally a diffusion burn, which occurs when fuel is injected into the combustor without premixing it with air. The fuel diffuses in the combustor air and burns as it diffuses. The pilot flame front maintains a mixture in the diffusion where the fuel/air ratio is sufficiently rich to ensure combustion stability under nearly all operating conditions. However, a diffusion flame burns at a higher flame temperature and produces more NOx than does a lean premix burn. Combustion temperature and NOx production both peak at or near stoichiometric equivalence, where the amounts of oxygen and fuel are matched for the reaction. A relatively small pilot flame can produce most of the NOx in the combustor.

Peak flame temperature is also determined by the fuel selection. Increasing the carbon to hydrogen ratio of a fuel increases its flame temperature, and hence increases NOx production. Natural gas is a commonly used gas turbine fuel. It is a mixture of hydrocarbon gases, principally methane together with varying proportions of ethane, propane, butane, and other gases.

Dimethyl ether ($CH_3OCH_3$), or DME, can be produced from natural gas and it is one means of delivering natural gas from remote sources. Other means include liquefied natural gas and conversion of natural gas to products like methanol, diesel fuel, and jet fuels.

BRIEF DESCRIPTION OF THE DRAWING

The invention is explained in following description in view of the sole FIGURE that is a schematic illustration of a combustion apparatus using different fuels for a primary combustion zone and a pilot combustion zone.

DETAILED DESCRIPTION OF THE INVENTION

Methane ($CH_4$) and natural gas are not oxygenated, and have relatively high ignition temperatures. Oxygenated fuels, such as methanol ($CH_3OH$), have substantially lower flame temperatures and generate less NOx. DME is an oxygenated fuel with a much lower auto-ignition temperature (about 240° C.) compared to that of natural gas (about 600° C.). The present inventor has innovatively recognized that these characteristics may be exploited in a novel manner to provide a combustion apparatus generating lower oxides of nitrogen than prior art devices.

The sole FIGURE schematically illustrates a combustion apparatus 10 including a combustor 12 with a combustor wall 20 enclosing airflow 22, primary fuel nozzles 24, a primary combustion zone 25, a pilot fuel nozzle 28, and a pilot combustion zone 29. The primary nozzles are outlets of air/fuel premixers 26, in which a primary fuel 30 is injected into a portion of the airflow 22 to produce a premix of air and fuel at a desired ratio as known in the art. A premixing stage of a combustor may comprise one or more premixers. The primary fuel 30 may be natural gas or another gaseous or liquid fuel as known in the art. It is supplied from a primary fuel storage vessel 32 or a utility line (not shown) via primary fuel system, including a primary fuel line 34 and primary controls 36 as known in the art. In one embodiment, the combustion apparatus 10 may be part of a gas turbine engine of an electrical power production facility.

The pilot fuel nozzle 28 is supplied with a second type of fuel 40 from a second storage vessel 42 via second fuel system, including a pilot fuel line 46 and pilot fuel controls 48. The second fuel type is different than the primary fuel 30 and is selected to provide a stable diffusion flame while producing a combustion product with a reduced emission, for example a reduce concentration of NOx, in comparison to a combustion product that would be produced by the burning of the primary fuel 30 with a diffusion pilot stage of the same primary fuel 30. In this way, the two fuels are specialized for their respective roles, increasing overall combustion efficiency and lowering emissions.

When natural gas is used as the primary fuel 30, dimethyl ether (DME) may be used as the pilot fuel 40 in one embodiment. DME is physically similar to natural gas, but has a lower combustion temperature. DME is a colorless, water-soluble gas with the formula $CH_3OCH_3$. It is a cleaner burning alternative to natural gas. DME is commonly made from natural gas, and can also be made from other hydrocarbon fuel stocks, even coal and biomass. It is called a pilot fuel oxygenate because it contains some oxygen. Compared to a non-oxygenated fuel such as natural gas, DME burns more stably at a lower temperature. It produces lower NOx, CO, and unconverted hydrocarbon emissions compared to natural gas. Sulfur emission is completely avoided, because DME is sulfur free. DME can be derived from the same starting materials as methanol, but produces a better quality fuel than methanol. DME has the vapor pressure of propane, and can be used without additional pumping requirements. Other fuels providing a relatively cleaner-burning pilot flame, in particular other oxygenated fuels, may be used in other embodiments. Methanol is an oxygenated fuel that may be used for this purpose in one embodiment. Ethanol, another alcohol based fuel which is now in wide production in the United States may be used in another embodiment. Ethanol has more carbon bearing material than methanol and produces a higher flame temperature, but one that is still lower than the methane (or propane) found in natural gases.

Existing DLN combustor designs can be adapted to the present invention by modifying the pilot leg of the existing fuel injection system as needed to provide separate storage and appropriate flow controls for the selected pilot fuel. Although storing and managing two fuels adds complexity in the fuel system, it may reduce the overall complexity of a combustion system by avoiding the need for selective catalytic reduction (SCR) to meet environmental regulations such as a requirement for less than 5 ppm NOx. Since the pilot flow is small, the pilot fuel storage requirement is small. The pilot flow is typically less than 5% of the primary flow. This allows the use of a more costly pilot fuel in order to obtain significantly lower total emissions while maintaining the use of a less costly primary fuel for generating the bulk of the heat energy. In case the pilot fuel is depleted, a bypass line (not shown) may be provided between the primary and secondary fuel systems to temporarily use the primary fuel for the pilot, with an appropriate change in the pilot flow rate being made via the pilot flow controls 48 if needed. As an alternative to procuring two fuels, a reformer 50 may be added on site to convert a portion of the primary fuel 30 to the pilot fuel 40 as known in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of combusting fuel, the method comprising:
   premixing a primary fuel with air in a premixing stage to produce an air/fuel premix;
   burning the air/fuel premix in a primary combustion zone of a combustor;
   diffusing a second fuel into a pilot combustion zone of the combustor, wherein the second fuel is a fuel different from the primary fuel and is selected to produce a lower emission in a diffusion burn than would be achieved in a diffusion burn of the primary fuel in the pilot combustion zone; and
   burning the diffused second fuel in a diffusion flame in the pilot combustion zone simultaneously with the burning of the air/fuel premix in the primary combustion zone.

2. The method of claim 1, wherein the second fuel is selected to have a lower diffusion burning temperature than the primary fuel.

3. The method of claim 1, wherein the first fuel is non-oxygenated and the second fuel is a fuel oxygenate.

4. The method of claim 3, wherein the second fuel is produced by reforming a portion of the first fuel.

5. The method of claim 1, wherein the second fuel is a fuel oxygenate.

6. The method of claim 1, wherein the second fuel is dimethyl ether.

7. The method of claim 1, wherein the first fuel comprises natural gas and the second fuel comprises dimethyl ether.

8. The method of claim 1, wherein the first fuel comprises natural gas and the second fuel comprises a fuel oxygenate, and further comprising controlling the method to limit production of NOx to less than 5 ppm without the need for post-combustion catalytic treatment.

9. The method of claim 8, wherein the second fuel is selected to comprise dimethyl ether.

10. A combustion apparatus designed to practice the method of claim 1.

11. A combustion apparatus comprising:
    a primary combustion zone and an associated pilot combustion zone;
    a pre-mixing stage directing a pre-mix of air and a non-oxygenated primary fuel into the primary combustion zone; and
    a pilot stage directing a diffusion of a pilot fuel oxygenate into the pilot combustion zone;
    wherein the combustion apparatus burns the primary fuel and the pilot fuel oxygenate simultaneously to produce a combustion product exhibiting a reduced emission when compared to a combustion product that would be produced by the burning of the pre-mix of primary fuel with a diffusion pilot stage of the primary fuel.

12. The combustion apparatus of claim 11, wherein the pilot fuel oxygenate is selected to have a lower diffusion flame temperature than that of the primary fuel to produce a reduced NOx emission.

13. The combustion apparatus of claim 11, wherein the primary fuel comprises natural gas and the pilot fuel oxygenate comprises dimethyl ether.

14. The combustion apparatus of claim 11, further comprising a reformer converting a portion of the primary fuel into the pilot fuel oxygenate.

15. A gas turbine engine comprising the combustion apparatus of claim 11.

16. A combustion apparatus comprising:
    a primary combustion zone;
    a primary fuel element in fluid communication with an air/fuel premixer for delivering a primary fuel premix into the primary combustion zone;
    a pilot combustion zone associated with the primary combustion zone;
    a pilot fuel element in fluid communication with a diffusion nozzle for delivering a pilot fuel diffusion into the pilot combustion zone; and
    a reformer connected between the primary fuel element and the pilot fuel element for converting a portion of primary fuel into pilot fuel.

17. The combustion apparatus of claim 16, further comprising the reformer converting a portion of a natural gas primary fuel into a dimethyl ether pilot fuel.

18. The combustion apparatus of claim 16, wherein the pilot fuel element delivers an oxygenated pilot fuel diffusion.

19. The combustion apparatus of claim 16, wherein the reformer converts the portion of primary fuel into a pilot fuel oxygenate having a lower diffusion flame temperature than that of the primary fuel.

20. The combustion apparatus of claim 19, wherein the reformer converts the portion of primary fuel into dimethyl ether.

* * * * *